US012572793B1

(12) United States Patent
Yan et al.

(10) Patent No.: US 12,572,793 B1
(45) Date of Patent: Mar. 10, 2026

(54) SUBROUTINE NEURAL NETWORKS

(71) Applicant: Google LLC, Mountain View, CA (US)

(72) Inventors: Yujun Yan, Ann Arbor, MI (US);
Kevin Jordan Swersky, Toronto (CA);
Milad Olia Hashemi, San Francisco,
CA (US)

(73) Assignee: Google LLC, Mountain View, CA (US)

( * ) Notice: Subject to any disclaimer, the term of this
patent is extended or adjusted under 35
U.S.C. 154(b) by 878 days.

(21) Appl. No.: 17/068,691

(22) Filed: Oct. 12, 2020

Related U.S. Application Data

(60) Provisional application No. 63/078,305, filed on Sep.
14, 2020.

(51) Int. Cl.
| | |
|---|---|
| *G06N 3/08* | (2023.01) |
| *G06N 3/04* | (2023.01) |
| *G06N 3/045* | (2023.01) |
| *G06N 3/0455* | (2023.01) |

(52) U.S. Cl.
CPC .............. *G06N 3/08* (2013.01); *G06N 3/045*
(2023.01); *G06N 3/04* (2013.01); *G06N*
*3/0455* (2023.01)

(58) Field of Classification Search
CPC ............ G06N 3/08; G06N 3/045; G06N 3/04;
G06N 3/0455
See application file for complete search history.

(56) References Cited

U.S. PATENT DOCUMENTS

| | | | | |
|---|---|---|---|---|
| 10,635,974 | B2 * | 4/2020 | Reed | ......................... G06N 3/09 |
| 2020/0293828 | A1 * | 9/2020 | Wang | ..................... G06N 20/00 |
| 2024/0362894 | A1 * | 10/2024 | Yu | .......................... G06V 20/70 |

OTHER PUBLICATIONS

Zhou, L., Zhou, Y., Corso, J. J., Socher, R., & Xiong, C. (2018).
End-to-end dense video captioning with masked transformer. In
Proceedings of the IEEE conference on computer vision and pattern
recognition (pp. 8739-8748). (Year: 2018).*
Ghazvininejad et al. "Mask-predict: Parallel decoding of condi-
tional masked language models." arXiv preprint arXiv: 1904.09324
(Year: 2019).*
Yan Y et al., Neural Execution Engines: Learning to Execute
Subroutines. arXiv preprint arXiv:2006.08084. (Jun. 15, 2020).*

(Continued)

*Primary Examiner* — Adam C Standke
(74) *Attorney, Agent, or Firm* — Fish & Richardson P.C.

(57) ABSTRACT

Methods, systems, and apparatus, including computer pro-
grams encoded on a computer storage medium, for gener-
ating an output sequence from an input sequence. In one
aspect, one of the systems includes one or more subroutine
neural networks each comprising: an encoder neural net-
work configured to receive an encoder network input com-
prising i) a subroutine input sequence of the subroutine
neural network and ii) an input mask that masks one or more
subroutine input elements of the subroutine input sequence
and to generate an encoded representation of the encoder
network input; a decoder neural network configured to
receive the encoded representation and to generate the
subroutine network output; and a masking neural network
configured to generate an output mask, wherein the output
mask will be used as the input mask of the encoder neural
network at a subsequence time step of the plurality of time
steps.

20 Claims, 6 Drawing Sheets

(56) References Cited

OTHER PUBLICATIONS

Tripathi, A., Lu, H., & Sak, H. (May 2020). End-to-end multi-talker overlapping speech recognition. In ICASSP 2020—2020 IEEE International Conference on Acoustics, Speech and Signal Processing (ICASSP) (pp. 6129-6133). IEEE. (Year: 2020).*

Zhou, L., Zhou, Y., Corso, J. J., Sacher, R., & Xiong, C. (2018). End-to-end dense video captioning with masked transformer. In Proceedings of the IEEE conference on computer vision and pattern recognition (pp. 8739-87 48) (Year: 2018).*

Germain, Mathieu, et al. "Made: Masked autoencoder for distribution estimation." International conference on machine learning. PMLR, (Year: 2015).*

Liu L, Huang Y. Masked pre-trained encoder base on joint ctc-transformer. arXiv preprint arXiv:2005.11978. May 25, 2020.*

Bahdanau et al., "Neural machine translation by jointly learning to align and translate," arXiv:1409.0473, Sep. 2014, 15 pages.

Barabási et al., "Emergence of scaling in random networks," Science, Oct. 1999, 286(5439):509-12.

Bunel et al., "Leveraging grammar and reinforcement learning for neural program synthesis," arXiv preprint arXiv:1805.04276, May 2018, 15 pages.

Cai et al., "Making neural programming architectures generalize via recursion," arXiv preprint arXiv:1704.06611, Apr. 2017, 20 pages.

Dehghani et al., "Universal transformers," arXiv preprint arXiv:1807.03819, Jul. 2018, 23 pages.

Devlin et al., "Bert: Pre-training of deep bidirectional transformers for language understanding," arXiv preprint arXiv:1810.04805, Oct. 2018, 16 pages.

Devlin et al., "Robustfill: Neural program learning under noisy i/o," arXiv preprint arXiv:1703.07469, Mar. 2017, 18 pages.

Dong et al., "Neural logic machines," arXiv preprint arXiv:1904.11694, Apr. 2019, 22 pages.

Erdős et al., "On the evolution of random graphs," Publ. Math. Inst. Hung. Acad. Sci., Jan. 1960, 5(1):17-60.

Esmaeilzadeh et al., "Neural acceleration for general-purpose approximate programs," 45th Annual IEEE/ACM International Symposium on Microarchitecture, Dec. 2012, 449-460.

Freivalds et al., "Neural Shuffle-Exchange Networks—Sequence Processing in O (n log n) Time," Advances in Neural Information Processing Systems, 2019, 6630-6641.

Graves et al., "Hybrid computing using a neural network with dynamic external memory," Nature, Oct. 2016, 538(7626):471-6.

Graves et al., "Neural turing machines," arXiv preprint arXiv:1410.5401, Oct. 2014, 26 pages.

Joulin et al., "Inferring algorithmic patterns with stack-augmented recurrent nets," Advances in Neural Information Processing Systems, 2015, 190-198.

Kaiser et al., "Neural gpus learn algorithms," arXiv preprint arXiv:1511.08228, Nov. 2015, 9 pages.

Krizhevsky et al., "Imagenet classification with deep convolutional neural networks." Communications of the ACM, May 2017, 60(6):84-90.

Kurach et al., "Neural random-access machines," arXiv preprint arXiv:1511.06392, Nov. 2015, 17 pages.

Mikolov et al., "Distributed representations of words and phrases and their compositionality," Advances in neural information processing systems, 2013, 26:3111-9.

Neelakantan et al., "Neural programmer: Inducing latent programs with gradient descent," arXiv preprint arXiv:1511.04834, Nov. 2015, 18 pages.

Newman et al., "Renormalization group analysis of the small-world network model," Physics Letters A., Dec. 1999, 263(4-6):341-6.

Paccanaro et al., "Learning distributed representations of concepts using linear relational embedding," IEEE Transactions on Knowledge and Data Engineering, Mar. 2001, 13(2):232-44.

Parisotto et al., "Neuro-symbolic program synthesis," arXiv preprint arXiv:1611.01855, Nov. 2016, 14 pages.

Radford et al., "Language models are unsupervised multitask learners," OpenAI blog, Feb. 2019, 1(8):9.

Reed and De Freitas, "Neural Programmer—Interpreters," arXiv preprint arXiv:1511.06279, Nov. 2015, 15 pages.

Shi et al., "Learning Execution through Neural Code Fusion," arXiv preprint arXiv:1906.07181, Jun. 2019, 13 pages.

Sukhbaatar et al., "End-to-end memory networks," Advances in neural information processing systems, 2015, 2440-2448.

Sutskever et al., "Sequence to sequence learning with neural networks," Advances in neural information processing systems, 2014, 3104-3112.

Sutskever et al., "Using matrices to model symbolic relationship," Advances in neural information processing systems, 2008, 21:1593-600.

Trask et al., "Neural arithmetic logic units," Advances in Neural Information Processing Systems, 2018, 8035-8044.

Vaswani et al.. "Attention is all you need," Advances in Neural Information Processing Systems, 2017, 30:5998-6008.

Veličković et al., "Graph attention networks," arXiv preprint arXiv:1710.10903, Oct. 2017, 12 pages.

Vinyals et al., "Pointer networks," Advances in neural information processing systems, 2015, 2692-2700.

Von Neumann et al., "First Draft of a Report on the EDVAC," IEEE Annals of the History of Computing, 1993, 15(4):27-75.

Yan et al., "Neural Execution Engines: Learning to Execute Subroutines," Advances in Neural Information Processing Systems, 2020, 33 pages.

* cited by examiner

SUBROUTINE
NETWORK OUTPUT
104

SUBROUTINE
NETWORK INPUT
102

SUBROUTINE NEURAL NETWORKS

CROSS-REFERENCE TO RELATED APPLICATION

This application claims priority to U.S. Provisional Application No. 63/078,305, filed on Sep. 14, 2020. The disclosure of the prior application is considered part of and is incorporated by reference in the disclosure of this application.

BACKGROUND

This specification relates to transducing sequences using neural networks. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system that uses a neural network system that has been trained to replicate algorithmic reasoning to process network inputs and to generate network outputs according to the algorithmic reasoning. In particular, the neural network system can include a sequence of one or more subroutine neural networks that are each configured through training to execute an algorithmic subroutine.

In some implementations, the one or more of the subroutine neural networks are sequence transductions neural networks; that is, the subroutine neural networks have been trained to receive a subroutine network input that includes a subroutine input sequence of multiple subroutine input elements and to process the subroutine network input to generate a subroutine network output that includes an output sequence. For example, each subroutine neural network can include a self-attention-based neural network.

In some implementations, e.g., when the neural network system is a sequence transduction neural network, the neural network system can execute each subroutine neural network at each of multiple execution time steps in order to generate the network output of the neural network system.

As a particular example, one or more of the subroutine neural networks can include three subnetworks: an encoder neural network, a decoder neural network, and a masking neural network. The encoder neural network can be configured to receive i) the subroutine network input that includes the subroutine input sequence and ii) an input mask that is the same size as the subroutine input sequence and that masks one or more of the subroutine input elements, and to generate an encoded representation of the subroutine network input. The decoder neural network can be configured to receive the encoded representation and to generate the subroutine network output. The masking neural network can be configured to receive the input mask and, optionally, an intermediate output of the decoder neural network and to generate an output mask. In some implementations, the output mask generated by a subroutine neural network at a first execution time step of the neural network system is the input mask of the subroutine neural network at a later execution time step; instead or in addition, the output mask can be the input mask for a different subroutine neural network at a later execution time step.

Particular embodiments of the subject matter described in this specification can be implemented so as to realize one or more of the following advantages.

Conventionally, a neural network performs well when provided inputs from the specific distribution on which the neural network has been trained. However, for a neural network to perform algorithmic reasoning, the neural network must be able to generate outputs regardless of the input distribution, including input examples that are outside of the distribution of examples on which the neural network was trained. Using the techniques described in this specification, a neural network system can leverage self-attention and a conditional masking mechanism to perform algorithmic reasoning consistently on a wide range of input examples.

Using techniques described in this specification, a neural network system can compose multiple subroutine neural networks that have been trained to perform particular algorithmic subroutines in order to accomplish a higher-order task. The subroutine neural networks can be pre-trained, and can be composed together as-is, without requiring further training of the neural network system.

Using techniques described in this specification, a system can learn binary embeddings of numbers that, when used as input to a neural network system, allow the neural network system to generalize on numerical values outside of the range of values seen by the neural network system during training. This is because a binary embedding of a value, which can be viewed as a sum of embeddings of the binary components of the value, is well-structured and interpretable by the neural network system.

Self-attention, sometimes called intra-attention, is an attention mechanism relating different positions of a single sequence in order to compute a representation of the sequence. The use of attention mechanisms allows a sequence transduction neural network to effectively learn dependencies between distant positions during training, improving the accuracy of the sequence transduction neural network.

Using some existing techniques, a system needs to process an input sequence autoregressively over multiple passes to generate a network output. In some implementations described in this specification, a subroutine neural network can process an input sequence to generate a network output in a single pass. Furthermore, subroutine neural networks described in this specification can avoid vanishing and exploding gradients over long input sequences.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that executes a neural network system configured to perform algorithmic reasoning. The neural network system can include one or more subroutine neural networks configured to execute respective algorithmic subroutines.

In this specification, a neural network system is said to perform "algorithmic reasoning" when the neural network system has been trained to receive a network input and to process the network input according to a predetermined algorithm to generate a network output. That is, the neural network system has been trained to process the network input according to one or more defined steps of the algorithm to generate a network output that characterizes the desired output of the algorithm. For example, the neural network system might include multiple subroutine neural networks that each have been trained to execute a respective step of the algorithm.

For example, the neural network system can include one or more comparison subroutine neural networks that have been trained to perform comparison operations. That is, the comparison subroutine neural networks can be configured to receive a subroutine network input that includes a sequence of values and to compare the values to generate a subroutine network output. For example, the comparison subroutine neural network can be configured to identify the minimum or maximum value in the sequence of values.

As another example, the neural network system can include one or more arithmetic subroutine neural networks that have been trained to perform arithmetic operations. That is, the arithmetic subroutine neural networks can be configured to receive a subroutine network input that includes a sequence of values and to perform an arithmetic operation on the values. For example, the arithmetic subroutine neural network might be configured to add, subtract, multiply, or divide the sequence of numbers.

As another example, the neural network system can include one or more pointer manipulation subroutine neural networks that have been trained to perform pointer manipulation operations. That is, the pointer manipulation neural networks can be configured to receive a subroutine network input that includes a sequence of values and to generate a pointer to one or more of the values in the sequence. Optionally, the pointer manipulation neural network can perform additional computation after generating the one or more pointers.

Figure 1:
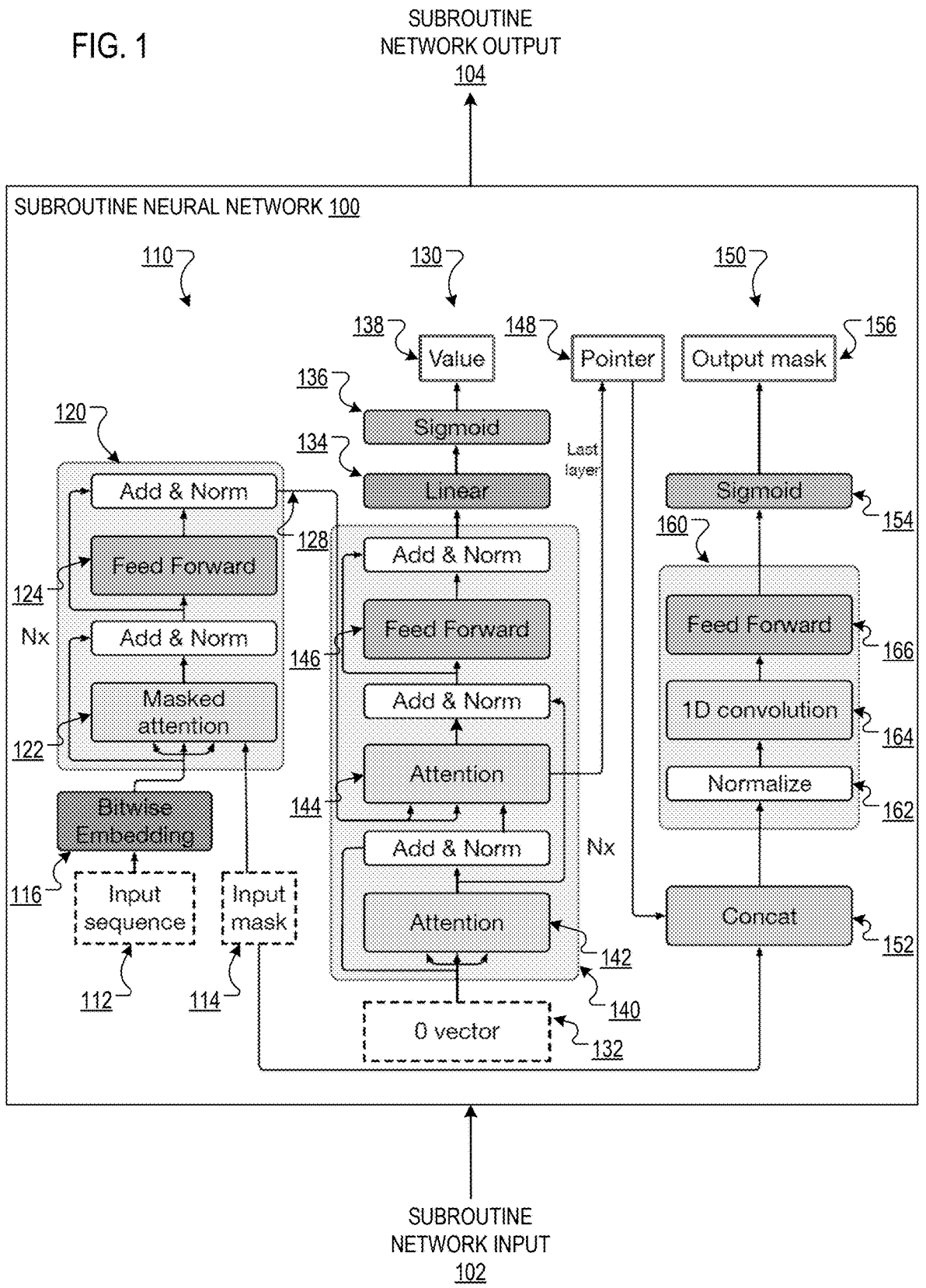
FIG. 1 is a diagram of an example subroutine neural network.

FIG. 1 shows an example subroutine neural network 100. The subroutine neural network 100 is an example of a system implemented as computer programs on one or more computers in one or more locations, in which the systems, components, and techniques described below can be implemented.

The subroutine neural network 100 can be a component of a neural network system that has been trained to perform algorithmic reasoning. The subroutine neural network 100 receives a subroutine network input 102 and processes the subroutine network input 102 to generate a subroutine network output 104, according to a particular algorithmic subroutine on which the subroutine neural network 100 has been trained.

That is, the format of the subroutine network input 102 and the subroutine network output 104, and what each represents, depends upon the algorithmic subroutine that the subroutine neural network 100 has been trained to execute. Example subroutine neural networks 100 are described below with respect to FIGS. 2A, 2B, 3A, and 3B.

The subroutine neural network 100 can be executed at each of multiple time steps of the neural network system. That is, at each time step, the subroutine neural network 100 receives a subroutine network input 102 and generates a subroutine network output 104.

The subroutine network input 102 includes an input sequence 112. The input sequence 112 has a respective subroutine input element at each of multiple subroutine input positions in an input order; that is, the input sequence 112 has multiple input elements arranges according to an input order. The subroutine network input 102 can also include an input mask 114. The input mask 114 is the same size as the input sequence 112 and is used by a masked self-attention layer 122 of the encoder neural network 110 to mask one or more of the input elements in the input sequence 112. In some implementations, the input sequence 112 is the same across each of the multiple time steps, while the input mask 114 is different at each time step.

The subroutine neural network 100 includes an encoder neural network 110, a decoder neural network 130, and a masking neural network 150.

The encoder neural network 110 is configured, at each of the multiple time steps, to receive an encoder network input that includes i) the input sequence 112 and ii) an input mask 114 and to generate an encoded representation 128 of the encoder network input.

The input mask 114 is the same size as the input sequence 112 and masks one or more elements of the input sequence 112 from the encoder neural network 110. As will be described in more detail below, in some implementations, the input mask 114 has been generated by the masking neural network 150 at a previous time step. In some other implementations, the input mask 114 has been generated by a masking neural network of a different subroutine neural network in the neural network system. In the first time step, the input mask 114 can be predetermined. That is, in the first time step, the input mask 114 can have the same format in each execution of the subroutine neural network 100; this format can depend on the size of the input sequence 112.

The encoded representation 128 of the encoder network input can include a respective encoded representation of each of the input elements in the input sequence 112 that have not been masked by the input mask 114. Generally, an encoded representation is a vector or other ordered collection of numeric values.

The decoder neural network 130 is configured, at each of the multiple time steps, to receive the encoded representation 128 and to generate the subroutine network output 104. The subroutine network output 104 can include an output value 138, an output pointer 148, or both.

The masking neural network 150 is configured, at each of the multiple time steps, to receive a masking network input that includes i) the input mask 114 and ii) an intermediate output generated by the decoder neural network 130 and to generate an output mask 156. The output mask 156 is the same size as the input sequence 112 and masks one or more elements of the input sequence 112.

In some implementations, the output mask 156 generated by the masking neural network at a current time step of the multiple time steps is the input mask 114 of the encoder neural network 110 at a subsequent time step. Instead or in addition, the output mask 156 at the current time step can be the input mask for an encoder neural network of a different subroutine neural network in the neural network system at the current time step or at a subsequent time step.

In some implementations, and as will be described in more detail below, both the encoder neural network 110 and the decoder neural network 130 are attention-based.

The encoder neural network 110 includes a bitwise embedding layer 116 and a sequence of one or more encoder subnetworks 120. In particular, as shown in FIG. 1, the encoder neural network 110 includes N encoder subnetworks 120.

The bitwise embedding layer 116 is configured to, for each subroutine input element in the input sequence 112, map the subroutine input element to a numeric representation of the subroutine input element in an embedding space, e.g., a vector in the embedding space. The bitwise embedding layer 116 then provides the numeric representations of the subroutine input elements to the first encoder subnetwork in the sequence of encoder subnetworks 120.

In particular, the bitwise embedding layer 116 is configured to determine, for each subroutine input element, an embedding of the subroutine input element according to the binary representation of the subroutine input element. For each subroutine input element, the bitwise embedding layer 116 can first generate a binary vector representation for the subroutine input element; that is, each position n in the binary vector representation represents the $2^n$ bit in the binary representation of the subroutine input element, and is equal to 0 or 1 according to whether the binary representation of the subroutine input element includes the $2^n$ bit. The bitwise embedding layer 116 can then perform linear projection of the binary vector representation to generate the embedding of the subroutine input element, i.e., the bitwise embedding layer 116 can multiply the binary vector representation by a machine-learned matrix. This process is equivalent to defining a learnable embedded representation for each bit position, and then, for each subroutine input element, determining a sum of the learnable embedded representations weighted by the value of the corresponding bit in the binary representation of the subroutine input element.

In some implementations, the bitwise embedded representations are learned. For example, the bitwise embedded representations can be learned jointly with the parameters of the subroutine neural network 100. As another example, the bitwise embedded representations can be learned by training a different neural network to perform a different task, e.g., by training a different neural network to perform addition or multiplication. As used in this specification, the term "learned" means that an operation or a value has been adjusted during the training of the subroutine neural network 100 or a different neural network.

In some implementations, the input sequence 112 can include one or more special tokens that have a corresponding embedded representation. For example, the special tokens can include one or more of: a start token denoting the start of a sentence, an end token denoting the end of a sentence, a delimiter token that delimits two subsequences, a zero token representing the value 0, or an infinity token representing infinity. In some such implementations, the start token and the zero token are the same token, and the end token and the infinity token are the same token.

In some implementations, the bitwise embedding layer 116 combines, for each subroutine input element, the embedded representation of the subroutine input element with a positional embedding of the input position of the subroutine input element in the input order to generate a combined embedded representation of the subroutine input element. That is, each position in the input sequence has a corresponding embedding, and for each subroutine input element the bitwise embedding layer 116 combines the embedded representation of the subroutine input element with the embedding of the subroutine input element's position in the input sequence 112. For example, the bitwise embedding layer 116 can concatenates or determine a sum or an average of the embedded representation of the subroutine input element and the positional embedding. Such positional embeddings can enable the model to make full use of the order of the input sequence without relying on recurrence or convolutions.

In some implementations, the positional embeddings are learned.

In some other implementations, the positional embeddings are fixed and are different for each position. For example, the positional embeddings can be made up of sine and cosine functions of different frequencies and can satisfy:

$$PE_{(pos,2i)} = \sin(pos/10000^{2i/d_{model}})$$

$$PE_{(pos,2i+1)} = \cos(pos/10000^{2i/d_{model}}),$$

where pos is the position, i is the dimension within the positional embedding, and $d_{model}$ is the dimensionality of the positional embedding (and of the other vectors processed by the subroutine neural network 100). The use of sinusoidal positional embeddings may allow the model to extrapolate to longer sequence lengths, which can increase the range of applications for which the model can be employed.

Each of the encoder subnetworks 120 is configured to receive i) a respective encoder subnetwork input element for each of the multiple of input positions and ii) the input mask 114, and to generate a respective subnetwork output element for each of the multiple of input positions.

The encoder subnetwork output elements generated by the last encoder subnetwork in the sequence are then used as the encoded representation 128 of the encoder network input.

For the first encoder subnetwork in the sequence, the encoder subnetwork input elements are the representations generated by the bitwise embedding layer 120. For each encoder subnetwork other than the first encoder subnetwork in the sequence, the encoder subnetwork input is the encoder subnetwork output of the preceding encoder subnetwork in the sequence.

Each encoder subnetwork 120 includes a masked self-attention layer 122. The masked self-attention layer 122 is configured to receive the encoder subnetwork input element for each of the multiple of input positions and, for each particular input position in the input order, apply an attention mechanism over the encoder subnetwork input elements at the input positions using one or more queries derived from the encoder subnetwork input element at the particular input position to generate a respective output for the particular input position. The masked self-attention layer 122 masks the encoder subnetwork input elements according to the input mask 114. In some implementations, the attention mechanism is a multi-head attention mechanism.

In some implementations, each of the encoder subnetworks 120 also includes a residual connection layer that combines the outputs of the masked self-attention layer with the inputs to the masked self-attention layer to generate an encoder self-attention residual output and a layer normalization layer that applies layer normalization to the encoder self-attention residual output. These two layers are collectively referred to as an "Add & Norm" operation in FIG. 1.

Some or all of the encoder subnetworks can also include one or more position-wise feed-forward neural network layers 124 that are configured to operate on each position in the input sequence separately. In particular, for each input position, the feed-forward neural network layers 124 are configured to receive an input at the input position and apply a sequence of transformations to the input at the input position to generate an output for the input position. For example, the sequence of transformations can include two or more learned linear transformations each separated by an activation function, e.g., a non-linear elementwise activation function, e.g., a ReLU activation function, which can allow for faster and more effective training on large and complex datasets. The inputs received by the position-wise feed-forward layers 124 can be the outputs of the layer normalization layer when the residual and layer normalization layers are included or the outputs of the masked self-attention layer 122 when the residual and layer normalization layers are not included. The transformations applied by the feed-forward layers 124 will generally be the same for each input position (but different feed-forward layers 124 will apply different transformations).

In cases where an encoder subnetwork 110 includes a position-wise feed-forward layer 124, the encoder subnetwork can also include a residual connection layer that combines the outputs of the position-wise feed-forward layer 124 with the inputs to the position-wise feed-forward layer 124 to generate an encoder position-wise residual output and a layer normalization layer that applies layer normalization to the encoder position-wise residual output. These two layers are also collectively referred to as an "Add & Norm" operation in FIG. 1. The outputs of this layer normalization layer can then be used as the outputs of the encoder subnetwork 120.

After the encoder neural network 110 generates the encoded representation 128 of the encoder network input, the decoder neural network 130 is configured to process the encoded representation 128 to generate the subroutine network output 104.

The decoder neural network 130 includes a sequence of decoder subnetworks 140, a linear layer 134, and an activation layer 136. In particular, as shown in FIG. 1, the decoder neural network 130 includes N decoder subnetworks 140. However, while the example of FIG. 1 shows the encoder neural network 110 and the decoder neural network 130 having the same number of subnetworks, in some cases the encoder neural network 110 and the decoder neural network 130 have different numbers of subnetworks. That is, the decoder neural network 130 can include more or fewer subnetworks than the encoder neural network 110.

Each decoder subnetwork 140 is configured to receive a decoder subnetwork input that includes a respective decoder subnetwork input elements for each of the multiple of input positions and to generate a decoder subnetwork output that includes a respective decoder subnetwork output element for each of the multiple input positions.

The first decoder subnetwork 140 in the sequence can receive a predetermined decoder subnetwork input 132, e.g., a zero-vector. The decoder subnetwork input of each subsequent decoder subnetwork 140 can be the decoder subnetwork output generated by the previous decoder subnetwork in the sequence.

Each decoder subnetwork 140 includes two different attention sub-layers: a decoder self-attention layer 142 and an encoder-decoder attention layer 144.

Each decoder self-attention layer 142 is configured to receive an input element for each input position and, for each particular input position, apply an attention mechanism over the input elements at the input positions using one or more queries derived from the input element at the particular input position to generate an updated representation for the particular input position. That is, the decoder self-attention layer 142 applies an attention mechanism to each element in the input to the decoder self-attention layer 142.

Each encoder-decoder attention layer 144, on the other hand, is configured to receive an input element for each input position and, for each particular input position, apply an attention mechanism over the encoded representation 128 at the input positions using one or more queries derived from the input element for the particular input position to generate an updated representation for the particular input position. Thus, the encoder-decoder attention layer 144 applies attention over the encoded representation 128 while the decoder self-attention layer 142 applies attention over input elements at the input positions.

In FIG. 1, the decoder self-attention layer 142 is shown as being before the encoder-decoder attention layer 144 in the processing order within the decoder subnetwork 140. In other examples, however, the decoder self-attention layer 142 may be after the encoder-decoder attention layer 144 in the processing order within the decoder subnetwork 140, or different subnetworks may have different processing orders.

In some implementations, each decoder subnetwork 140 includes, after the decoder self-attention layer 142, after the encoder-decoder attention layer 144, or after each of the two layers, a residual connection layer that combines the outputs of the attention layer with the inputs to the attention layer to generate a residual output and a layer normalization layer that applies layer normalization to the residual output. FIG. 1 shows the connection and normalization layers being inserted after each of the two attention layers, both referred to as an "Add & Norm" operation.

Some or all of the decoder subnetworks 140 can also include one or more position-wise feed-forward neural network layers 146 that are configured to operate in a similar manner as the position-wise feed-forward layers 124 from the encoder neural network 110. In particular, the feed-forward layers 146 are configured to, for each input position, receive an input element at the input position and apply a sequence of transformations to the input element at the input position to generate an output element for the input position. For example, the sequence of transformations can include two or more learned linear transformations each separated by an activation function, e.g., a non-linear elementwise activation function, e.g., a ReLU activation function. The input elements received by the position-wise feed-forward layers 146 can be the outputs of the layer normalization layer (following the last attention layer in the subnetwork 140) when the residual and layer normalization layers are included or the outputs of the last attention layer in the subnetwork 140 when the residual and layer normalization layers are not included.

In cases where a decoder subnetwork 140 includes a position-wise feed-forward layer 146, the decoder subnetwork 140 can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation in FIG. 1. The outputs of this layer normalization layer can then be used as the outputs of the decoder subnetwork 140.

The linear layer 134 applies a learned linear transformation to the output of the last decoder subnetwork 140 in order to project the output of the last decoder subnetwork 140 into the appropriate space for processing by the activation layer 136. The activation layer 136 then applies an activation function, e.g., the sigmoid activation function, over the outputs of the linear layer 134 to generate the output value 138 for the current time step.

In some implementations in which the subroutine network output 104 includes only the output pointer 148 and not the output value 138, the subroutine neural network 100 does not include the linear layer 134 or the activation layer 136. In some such implementations, the final decoder subnetwork 140 does not include any of the components of the decoder subnetwork 140 after the encoder-decoder attention layer 144 (which generates the output pointer 148, as described below), as they are not necessary.

In some implementations, as shown in FIG. 1, the output of the encoder-decoder attention layer 144 of the final decoder subnetwork 140 is the output pointer 148. In some other implementations, the output of the decoder self-attention layer 142 of the final decoder subnetwork 140 is the output pointer 148.

In some implementations, the subroutine neural network 100 determines the maximum or minimum value in the output of the attention layer 144 or 142 (corresponding to a respective input position in the input sequence 112), and determines the pointer to point to the determined maximum or minimum value.

The masking neural network 150 is configured to receive a masking network input that includes i) the input mask 114 and ii) an intermediate output of the decoder neural network 130, and to generate the output mask 156. As shown in FIG. 1, the intermediate output can be the output pointer 148, i.e., the output of an attention layer 144 or 142 of the final decoder subnetwork 140 of the decoder neural network 130.

In some implementations, the output mask 156 is an updated version of the input mask 114, updated in response to the output pointer 148 generated by the decoder neural network 130.

The masking neural network 150 includes a combining layer 152 that combines the input mask 114 and the output pointer 148 to generate a combined input. For example, the combining layer 152 can concatenate the input mask 114 and the output pointer 148. As another example, the combining layer 152 can multiple the input mask 114 and the output pointer 148. As another example, the combining layer 152 can determine the XOR between the two.

The masking neural network 150 includes a sequence of one or more masking subnetworks 160. As shown in FIG. 1, the masking neural network 150 includes a single masking subnetwork 160.

The first masking subnetwork 160 is configured to receive the combined input generated by the combining layer 152 and to generate a masking subnetwork output. Each subsequent masking subnetwork 160 is configured to receive the masking subnetwork output of the previous masking subnetwork 160 and to generate a masking subnetwork output.

Each masking subnetwork 160 includes one or more of: a normalization layer 162, a one-dimensional convolutional neural network layer 164, or a feed-forward neural network layer 166. The normalization layer 162 is configured to normalize the input to the masking subnetwork 160. The one-dimensional convolutional neural network layer is configured to process the output of the normalization layer 162 using a machine-learned one-dimensional convolutional kernel.

The feed-forward neural network layer 166 can be configured to operate in a similar manner as the position-wise feed-forward layers 124 from the encoder neural network 120 and the position-wise feed-forward layers 146 from the decoder neural network 130. In particular, the feed-forward neural network layer 166 is configured to, for each position in the output of the one-dimensional convolutional neural network layer 164, receive an element at the position and apply a sequence of transformations to the element at the position to generate an output element for the position.

The masking neural network 150 can include an activation layer 154 that receives the output of the final masking subnetwork 160 and generates the output mask 156.

The subroutine neural network 100 can provide the subroutine network output 104 corresponding to the current time step to an external system, e.g., to a subsequent subroutine neural network in the neural network system.

In some implementations, the subroutine neural network 100 can provide the subroutine network output 104, which include one or more of the output value 138 or the output pointer 148, to the external system before generating the output mask 156 using the masking neural network 150.

In some implementations, a training system can train each of the encoder neural network 110, the decoder neural network 130, and the masking neural network 150 in parallel using supervised learning. For example, at each time step, the training system can use i) a ground-truth output value and/or a ground-truth output pointer and ii) a ground-truth output mask to determine an error in i) the output value 138 and/or the output pointer 148 and ii) the output mask 156, respectively. The training system can then determine an update to the parameters of the encoder neural network 110, the decoder neural network 130, and the masking neural network 150 according to the determined errors, e.g., through backpropagation.

In some such implementations, the training system can provide feedback to the encoder neural network 110, the decoder neural network 130, and the masking neural network 150 at different frequencies. For example, the training system can use a ground-truth output value and/or a ground-truth output pointer to determine an update to the parameters of the encoder neural network 110 and the decoder neural network 130 at each training time step in a sequence of training time steps. The training system can use a ground-truth output mask to determine an update to the parameters of the masking neural network 150 at a subset of the training time steps in the sequence of training time steps, e.g., at every second training time step or at only the final training time step.

In some other implementations, a training system can train one or more of the encoder network 110, the decoder neural network 130, or the masking neural network 150 while keeping the other networks constant. As a particular example, the training system can determine an update to the parameters of the encoder neural network 110 and the decoder neural network 130 while freezing the parameters of the masking neural network 150.

In some other implementations, the training system does not directly train one or more of the encoder neural network 110, the decoder neural network 130, or the masking neural network 150 through supervised learning. For example, the training system can train the one or more networks in an unsupervised fashion. As a particular example, the training system can train the masking neural network 150 using reinforcement learning.

Figure 2A:
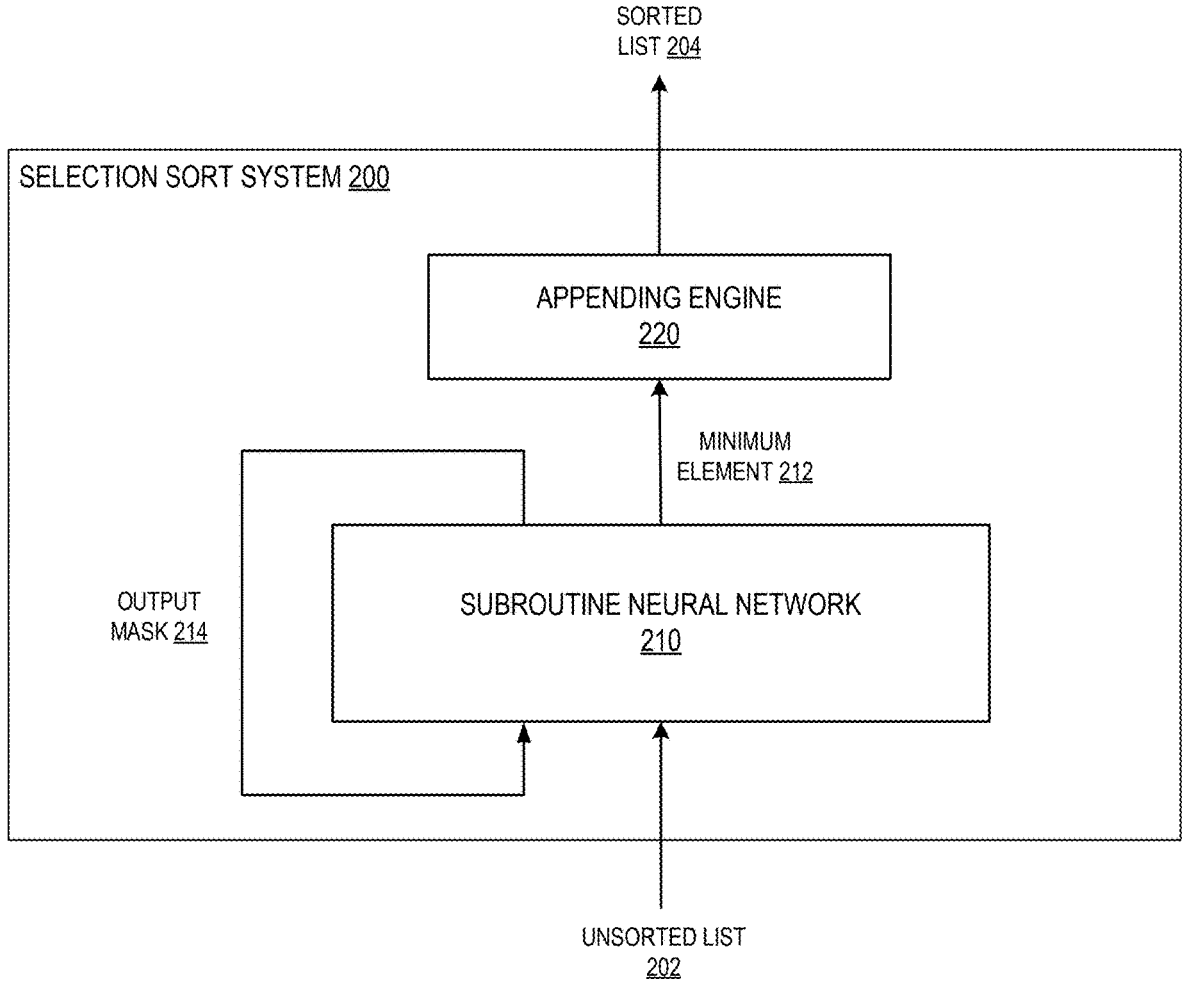
FIG. 2A is a diagram of an example neural network system configured to execute a "selection sort" algorithm.

FIG. 2A is a diagram of an example neural network system 200 that has been trained to execute a "selection sort" algorithm. The selection sort system 200 is an example of a system implemented as computer programs on one or more computers in one or more locations, in which the systems, components, and techniques described below can be implemented.

The selection sort algorithm is designed to receive a list of N unsorted values and to sort the N values into a sorted list. In order to sort the values, at each of N time steps, a system determines the minimum value in the unsorted list, removes the minimum value, and appends the minimum value to the sorted list. After N time steps, the unsorted list is empty and the sorted list includes each of the N values in the correct order.

The selection sort system 200 is configured to receive an unsorted list 202 of N elements and to output a sorted list 204 of the same N elements. The selection sort system 200 includes a subroutine neural network 210 that is configured to, at each of N time steps, identify the minimum element in the unsorted list 202.

The subroutine neural network 210 can have the same architecture as the subroutine neural network 100 depicted in FIG. 1. In particular, the unsorted list 202 can be the input sequence to the subroutine neural network 210.

The subroutine neural network 210 can have a predetermined initial input mask of all zeroes; that is, the initial input mask does not mask out any element of the unsorted list 202.

The subroutine neural network 210 can process the unsorted list 202 and the initial input mask to generate a pointer, e.g., the pointer 148 depicted in FIG. 1, to the minimum element 212 in the unsorted list. That is, the subroutine neural network 210 has been configured through training to generate a pointer to the minimum element 212 in the unsorted list 202 as the output of the decoder neural network of the subroutine neural network 210, e.g., the decoder neural network 130 depicted in FIG. 1. In particular, in this implementation the decoder neural network does not generate an output value, e.g., the output value 138 depicted in FIG. 1.

The masking neural network of the subroutine neural network 210, e.g., the masking neural network 150 depicted in FIG. 1, can generate an output mask 214 that masks out the selected minimum element 212 in the unsorted list 202. That is, the masking neural network can receive i) the initial input mask of all zeroes and ii) a pointer to the minimum element 212 in the unsorted list 202 and generate an output mask 214 of all zeroes except for the element of the output mask corresponding to the minimum element 212 in the unsorted list.

The subroutine neural network 210 can then provide the minimum element 212 to an appending engine 220 that appends the minimum element 212 to the sorted list 204. The subroutine neural network 210 can also output the output mask 214 so that the subroutine neural network 210 can use the generated output mask 214 as the input mask of the next time step. That is, in the next time step, the subroutine neural network 210 uses the output mask 214 (which masks out the minimum element 212 identified in the first time step) as the input mask, and again uses the unsorted list 202 as the input sequence, to generate a pointer to the next minimum element in the unsorted list 202.

After N time steps, the appending engine 220 has appended each subsequent minimum element 212 to the sorted list 204 so that each element of the unsorted list 202 is in the sorted list 204 in the correct order. The selection sort system 200 can then output the sorted list 204.

Figure 2B:
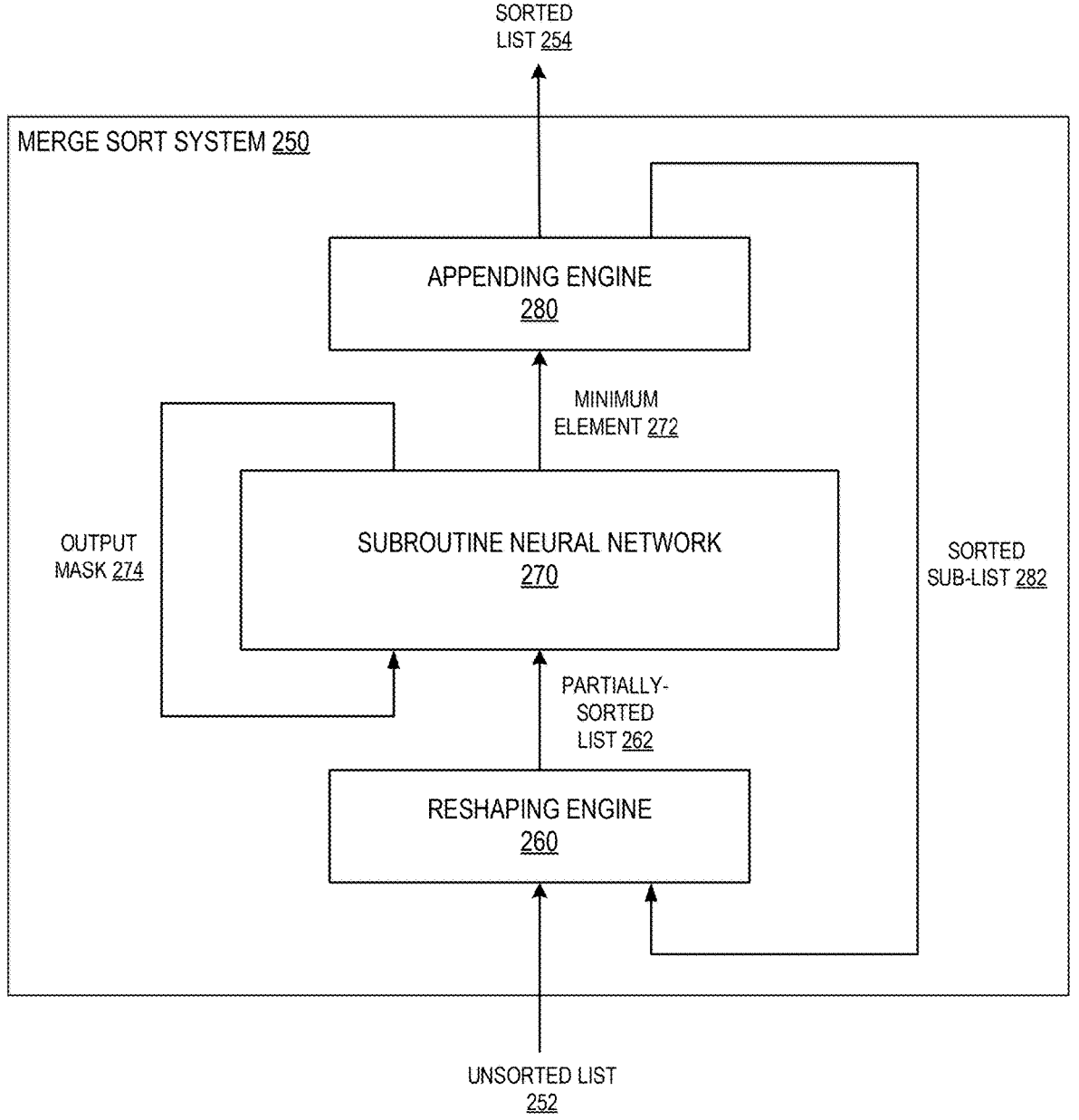
FIG. 2B is a diagram of an example neural network system configured to execute a "merge sort" algorithm.

FIG. 2B is a diagram of an example neural network system 250 that has been trained to execute a "merge sort" algorithm. The merge sort system 250 is an example of a system implemented as computer programs on one or more computers in one or more locations, in which the systems, components, and techniques described below can be implemented.

The merge sort algorithm is designed to receive a list of N unsorted values and to sort the N values into a sorted list. In order to sort the values, a system divides the unsorted list in half, generating two unsorted sub-lists, and recursively sorts the two unsorted sub-lists. The base case is a sub-list that has a single element, which is considered to be sorted.

At each step of the recursion, the system merges (i.e., concatenates) the two sorted sub-lists to generate an unsorted list consisting of two sorted halves. The system then sorts this unsorted lists to generate a sorted list. In particular, at each of multiple time steps, the system determines which sorted sub-list has the current minimum element and appends the determined minimum element to the sorted list.

To determine which sorted sub-list has the current minimum element, the system maintains two pointers, one pointing to each respective sorted sub-list. In the first time step, the two pointers point to the first elements of the respective sorted sub-lists (i.e., the smallest element of each sorted sub-list). When the system determines the minimum element between the two elements identified by the two pointers, the system advances the pointer corresponding to the minimum element by one.

The merge sort system 250 is configured to receive an unsorted list 252 of N elements and to output a sorted list 254 of the same N elements. The merge sort system 250 includes a subroutine neural network 270 that is configured to, at each of multiple execution time steps, receive a partially-sorted list 262 that consists of two sorted sub-lists, and to sort the partially-sorted list 262 across multiple sorting time steps to generate a sorted sub-list 282.

In particular, a reshaping engine 260 of the merge sort system 250 receives the unsorted list 252 and reshapes the unsorted list 252 into N sub-lists that each include a single element. The reshaping engine 260 can then merge sets of two sorted sub-lists to create partially-sorted lists 262, and at each execution time step provide a partially-sorted list 262 to the subroutine neural network 270.

The subroutine neural network 270 can have the same architecture as the subroutine neural network 100 depicted in FIG. 1. In particular, the partially-sorted list 262 can be the input sequence to the subroutine neural network 270.

At each execution time step, the subroutine neural network 270 can have a predetermined initial input mask of all ones, except for two zeroes corresponding to the respective first elements of the two sub-lists of the partially-sorted list 262; that is, the initial input mask masks out every element of the partially-sorted list 262 except the first (and smallest) elements of the two sub-lists. Thus, the subroutine neural network 270 only considers the two elements at the beginning of the respective sub-lists.

The subroutine neural network 267 can process the partially-sorted list 262 and the initial input mask to generate a pointer, e.g., the pointer 148 depicted in FIG. 1, to the minimum element 272 between the two elements of the respective sub-lists of the partially-sorted list 262. That is, the subroutine neural network 270 has been configured through training to generate a pointer to the minimum element 272 as the output of the decoder neural network of the subroutine neural network 270, e.g., the decoder neural network 130 depicted in FIG. 1.

The masking neural network of the subroutine neural network 270, e.g., the masking neural network 150 depicted in FIG. 1, can generate an output mask 274. The output mask 274 masks out the selected minimum element 272 and un-masks the subsequent element in the sub-list of the minimum element 272. That is, the masking neural network can receive i) the initial input mask and ii) a pointer to the minimum element 272 and generate an output mask 274 that masks every element except the next element in the sub-list of the selected minimum element 272 and the same un-masked element of the other sub-list.

The subroutine neural network 270 can then provide the minimum element 272 to an appending engine 280 that appends the minimum element 272 to a sorted sub-list 282 corresponding to the current execution time step. The sub-routine neural network 270 can also output the output mask 274 so that the subroutine neural network 270 can use the generated output mask 274 as the input mask of the next sorting time step. That is, in the next sorting time step, the subroutine neural network 270 uses the output mask 274 as the input mask, and again uses the partially-sorted list 262 as the input sequence, to generate a pointer to the next minimum element 272 in the partially-sorted list 262.

The partially-sorted list 262 can include an "end" token after each sub-list, and the subroutine neural network 270 can determine to complete the current execution time step when both pointers point to the respective "end" token.

After the final sorting time step, the appending engine 280 has appended each subsequent minimum element 272 to the sorted sub-list 282 so that each element of the partially-sorted list 262 is in the sorted sub-list 282 in the correct order. The appending engine 280 can then provide the sorted sub-list 282 to the reshaping engine 260, which can merge the sorted sub-list 282 of the current execution time step with the sorted sub-list of another execution time step to generate another partially-sorted list 262, and provide the new partially-sorted list 262 to the subroutine neural network 270 in a new execution time step.

After the final execution time step, in which the subroutine neural network 270 sorts a partially-sorted list 262 that includes every element in the unsorted list 252, the appending engine 280 will have generated the sorted list 254 that includes every element of the unsorted list 252 in the correct order. The merge sort system 250 can then output the sorted list 254.

Figure 3A:
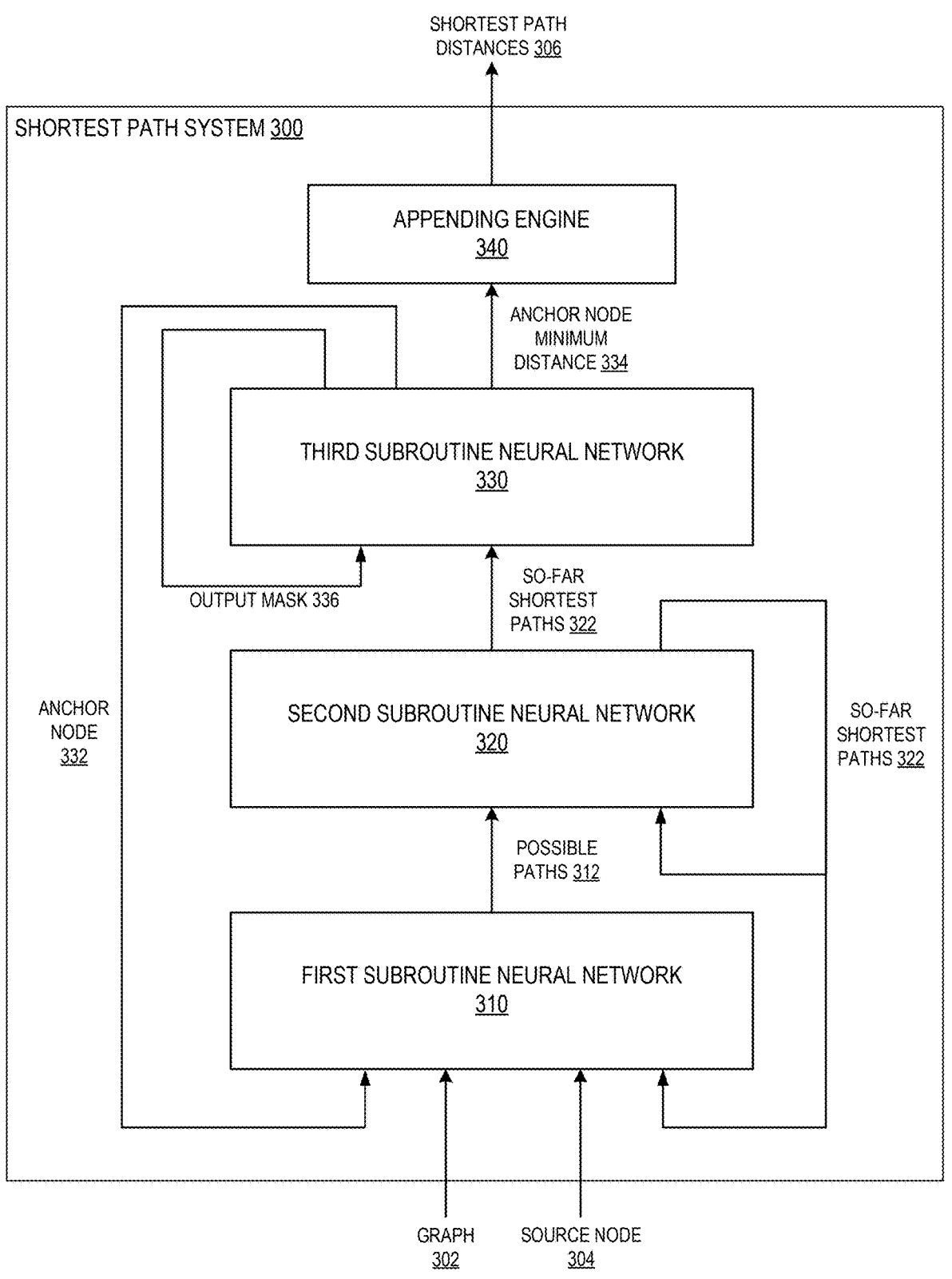
FIG. 3A is a diagram of an example neural network system configured to execute a shortest-path algorithm.

FIG. 3A is a diagram of an example neural network system 300 that has been trained to execute a shortest-path algorithm. The shortest path system 300 is an example of a system implemented as computer programs on one or more computers in one or more locations, in which the systems, components, and techniques described below can be implemented.

In particular, the shortest path system 300 is configured to execute Djikstra's algorithm for finding the shortest path from a source node in a graph to every other node in the graph.

To generate the set of shortest paths, a system initializes a set of "unvisited" nodes to be every node in the graph except the source node, initializes a set of "so-far" shortest path distances for every node in the set of unvisited nodes to be infinity, and initializes an "anchor" node to be the source node.

The system then determines, at each of multiple time steps, a set of possible paths and path distances between the anchor node and each neighbor of the anchor node in the graph. The system determines the possible path distance for each neighbor node by determining the sum between the shortest path distance of the anchor node and the distance between the anchor node and the neighboring node. At each time step, the shortest path distance of the anchor node is guaranteed to be accurate. In the first time step, the anchor node is the source node, and thus the shortest path distance is zero.

Then, at each of the multiple time steps, the system determines the minimum, for each neighboring node of the anchor node, between i) the determined possible path distance of the neighbor node and ii) the so-far shortest path distance of the neighbor node. The system updates the set of so-far shortest path distances for each neighbor node according to the determined minimum.

Then, at each of the multiple time steps, the system determines the minimum distance in the set of so-far shortest path distances, and determines the corresponding node to be the new anchor node. The system removes the new anchor node from the set of unvisited nodes, and determines the true shortest path distance for the new anchor node to be the value in the set of so-far shortest path distances. The system then repeats the above process for the new anchor node.

After the final time step, each node has been removed from the set of unvisited nodes, and the true shortest path distance of each node has been determined.

The shortest path system 300 is configured to receive i) data defining a graph 302 that includes data defining each node and edge in the graph 302 and ii) an identification of a source node 304 in the graph 302, and to generate a set of shortest path distances 306 from the source node to each node in the graph. The shortest path system 300 includes three subroutine neural networks 310, 320, and 330. Each subroutine neural network 310, 320, and 330 can have the same architecture as the subroutine neural network 100 depicted in FIG. 1.

The first subroutine neural network 310 can receive the data identifying the graph 302 and the source node 304. An anchor node 332 is initialized to be the source node 304. A set of so-far shortest paths 322 is initialized to be infinity for each node except the anchor node 332, for which the so-far shortest path is 0.

The first subroutine neural network 310 is configured to, at each of multiple time steps, generate a set of possible paths 312 for the neighboring nodes of the current anchor node 332 as described above. That is, the set of possible paths 312 characterizes, for each neighbor node of the anchor node 332, the sum of i) the so-far shortest path to the anchor node 332 identified in the set of so-far shortest paths 322 and ii) the distance of the edge between the anchor node 332 and the neighbor node.

In some implementations, the first subroutine neural network 310 receives multiple input sequences each corresponding to a respective neighboring node of the anchor node 332. The input sequence corresponding to a particular neighboring node can includes two elements: the so-far shortest path for the anchor node 332 and the path distance of the edge between the anchor node 332 and the neighboring node. The input mask of the first subroutine neural network 310 can be a mask of all zeros; that is, the input mask does not mask any element of the input sequences.

In some such implementations, the first subroutine neural network 310 can process each input sequence separately. In some other such implementations, the first subroutine neural network 310 can process each input sequence concurrently. As a particular example, the first subroutine neural network 310 can receive the multiple input sequences in a matrix, where each row corresponds to a respective different neighboring node. The first subroutine neural network 310 can provide this matrix as input to the encoder neural network of the first subroutine neural network 310.

In some implementations, the subroutine network output for the first subroutine neural network includes, for each neighboring node, an output value, e.g., the output value 138 depicted in FIG. 1, characterizing the sum of the so-far shortest path for the anchor node 332 and the distance of the edge between the anchor node 332 and the neighboring node. For example, the output value can be a vector that includes an element corresponding to each neighboring node. In some such implementations, the first subroutine neural network 310 does not generate an output pointer.

In some implementations, the first subroutine neural network 310 does not include a masking neural network. That is, because the input mask of the first subroutine neural network does not mask any elements of the input sequences, the first subroutine neural network does not need to generate an output mask that will be used as the input mask at future time steps.

The first subroutine neural network 310 can provide the set of possible paths 312 to the second subroutine neural network 320, which is configured to determine the minimum, for each neighboring node of the anchor node 332, between i) the determined possible path distance of the neighbor node in the set of possible paths 312, and ii) the so-far shortest path distance of the neighbor node in the set of so-far shortest paths 322. That is, for each neighboring node of the anchor node 332, the second subroutine neural network 320 can replace the so-far shortest path distance if the determined possible path distance is shorter, and output the updated set of so-far shortest paths 322.

In some implementations, the second subroutine neural network 320 receives multiple input sequences each corresponding to a respective neighboring node of the anchor node 332. The input sequence corresponding to a particular neighboring node can includes two elements: the so-far shortest path for the neighboring node identified in the set of so-far shortest paths 322 and the possible path for the neighboring node identified in the set of possible paths 312. The input mask of the second subroutine neural network 320 can be a mask of all zeros; that is, the input mask does not mask any element of the input sequences.

In some such implementations, the second subroutine neural network 320 can process each input sequence separately. In some other such implementations, the second subroutine neural network 320 can process each input sequence concurrently. As a particular example, the second subroutine neural network 320 can receive the multiple input sequences in a matrix, where each row corresponds to a respective different neighboring node. The second subroutine neural network 320 can provide this matrix as input to the encoder neural network of the second subroutine neural network 320.

In some such implementations, the subroutine network output for the second subroutine neural network 320 includes, for each neighboring node, an output pointer, e.g., the output pointer 148 depicted in FIG. 1, identifying the minimum element between the so-far shortest path for the neighboring node and the possible path for the neighboring node. For example, the output pointer can be a vector that includes an element corresponding to each neighboring node. In some such implementations, the second subroutine neural network 320 does not generate an output value.

In some implementations, the second subroutine neural network 320 does not include a masking neural network. That is, because the input mask of the second subroutine neural network does not mask any elements of the input sequences, the second subroutine neural network does not need to generate an output mask that will be used as the input mask at future time steps.

The second subroutine neural network 320 can provide the set of so-far shortest paths 322 to the third subroutine neural network 330, which is configured to determine the minimum distance in the set of so-far shortest paths 322.

In particular, the set of so-far shortest paths 322 can be the input sequence to the third subroutine neural network 330. The third subroutine neural network 330 can have a predetermined initial input mask that does not mask any element except the anchor node 332.

The third subroutine neural network 330 can process the set of so-far shortest paths 322 and the initial input mask to generate a pointer, e.g., the pointer 148 depicted in FIG. 1, to the minimum element in the set of so-far shortest paths 322. That is, the third subroutine neural network 330 has been configured through training to generate a pointer to the minimum element in the set of so-far shortest paths 322 as the output of the decoder neural network of the subroutine neural network 330, e.g., the decoder neural network 130 depicted in FIG. 1.

The masking neural network of the third subroutine neural network 330, e.g., the masking neural network 150 depicted in FIG. 1, can generate an output mask 336 that masks out the selected minimum element in the set of so-far shortest paths 322. That is, the masking neural network can receive i) the initial input mask and ii) a pointer to the minimum element in the set of so-far shortest paths 322 and generate an output mask 336 that is the same as the input mask except that the selected minimum element in the set of so-far shortest paths 322 is masked out (in the first time step, the output mask 336 is a mask of all zeros except the anchor node 332 and the selected minimum element).

The third subroutine neural network can determine the new anchor node 332 for the next time step to be the node corresponding to the determined minimum element of the set of so-far shortest paths 322.

The third subroutine neural network 330 can then provide the minimum distance 334 of the determined new anchor node 332 to an appending engine 340 that appends the minimum distance 334 to the set of shortest path distances 306. The third subroutine neural network 330 can provide data identifying the anchor node 332 to the first subroutine neural network 310.

The third subroutine neural network 330 can also output the output mask 336 so that the third subroutine neural network 330 can use the generated output mask 336 as the input mask of the next time step. That is, in the next time step, the third subroutine neural network 330 uses the output mask 336 as the input mask, and uses the set of so-far shortest paths 322 (which has been updated by the second subroutine neural network 320 in the next time step) as the input sequence, to generate a pointer to the next minimum element in the set of so-far shortest paths 322.

After the final time step, the appending engine 340 has appended each subsequent minimum distance 334 of the anchor nodes corresponding to each time step to the set of shortest path distances 306. The shortest path system 300 can then output the set of shortest path distances 306.

Figure 3B:
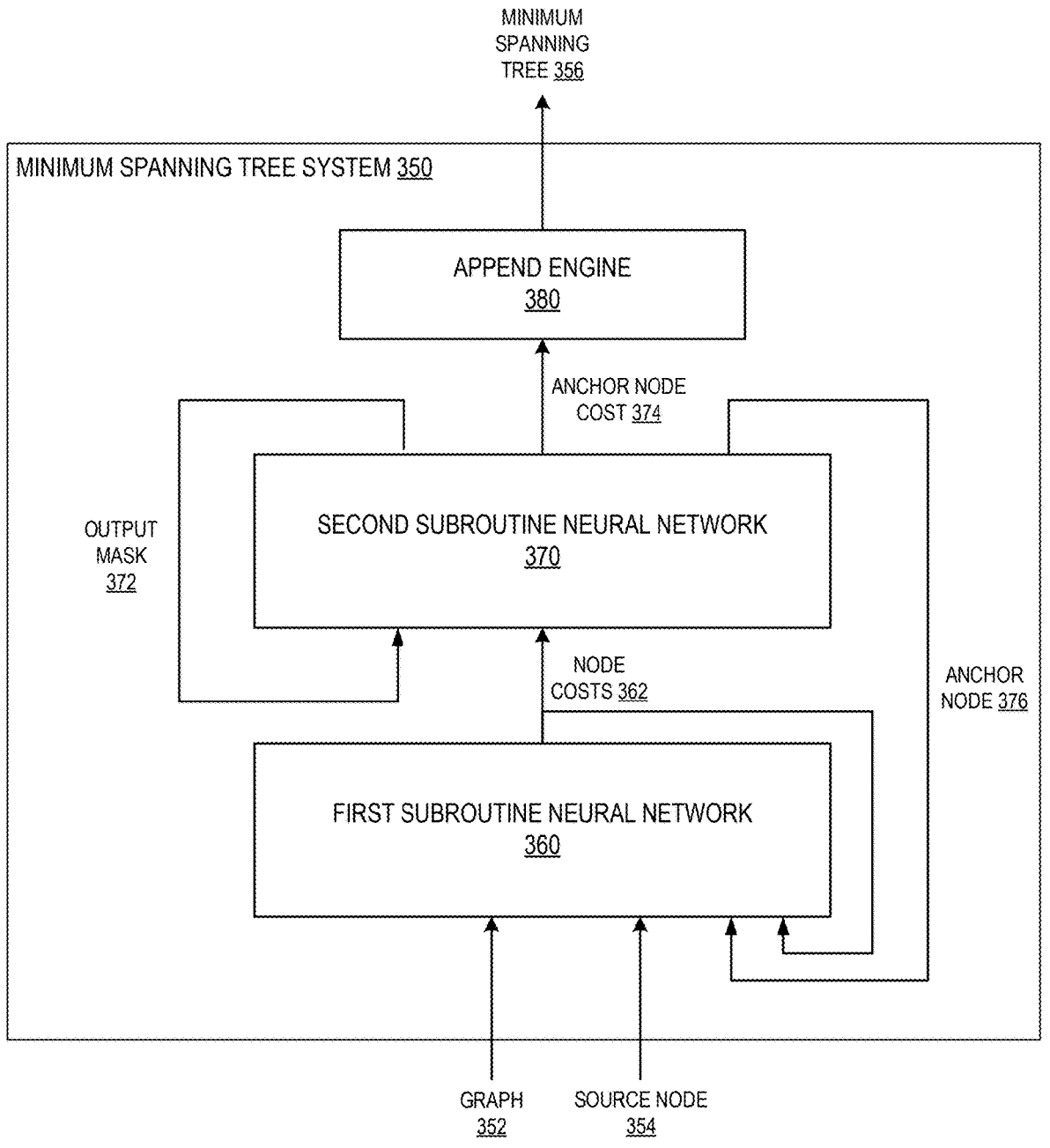
FIG. 3B is a diagram of an example neural network system configured to execute a minimum spanning tree algorithm.

FIG. 3B is a diagram of an example neural network system that has been trained to execute a minimum spanning tree algorithm.

The minimum spanning tree system 350 is an example of a system implemented as computer programs on one or more computers in one or more locations, in which the systems, components, and techniques described below can be implemented.

In particular, the minimum spanning tree system 350 is configured to execute Prim's algorithm for finding the minimum spanning tree of a graph.

To generate the set of nodes and edges that make up the minimum spanning tree, a system initializes the tree with a single anchor node, e.g., a source node provided to the system. The system can also initialize a set of remaining nodes to be every node in the graph except the anchor node, and initialize a set of node costs to be infinity for each node in the set of remaining nodes.

The system then determines, in each of multiple times steps, the minimum, for each neighboring node of the anchor node in the set of remaining nodes, between i) the node cost of the neighboring node in the set of node costs and ii) the cost of the edge between the anchor node and the neighboring node. The system updates the set of node costs using the determined minimum.

The system then determines, in each of the multiple time steps, the minimum node cost in the set of node costs, and determines the node corresponding to the minimum node cost to be the new anchor node. The system adds the new anchor node and the minimum node cost to the minimum spanning tree, removes the new anchor node from the set of remaining nodes, and repeats the above process in a new time step.

After the final time step, each node has been removed from the set of remaining nodes, and the minimum spanning tree has been determined.

The minimum spanning tree system 350 is configured to receive i) data defining a graph 352 that includes data defining each node and edge in the graph 352 and ii) an identification of a source node 354 of the graph 352, and to generate a minimum spanning tree 356 of the graph. The minimum spanning tree system 350 includes two subroutine neural networks 360 and 370. Each subroutine neural network 360 and 370 can have the same architecture as the subroutine neural network 100 depicted in FIG. 1.

An anchor node 376 can be initialized to be the source node 354. A set of node costs 362 can be initialized to be infinity for each node in the graph 352 except the anchor node 376, for which the node cost is zero.

The first subroutine neural network 360 can receive the data identifying the graph 352 and the source node 354. The first subroutine neural network 360 is configured to, at each of multiple time steps, update a set of node costs 362 which identifies the minimum cost of adding each node to the minimum spanning tree. In particular, for each neighbor of the anchor node 376, the first subroutine neural network 360 determines a minimum between i) the node cost of the neighboring node in the set of node costs 362 and ii) the cost of the edge between the anchor node 376 and the neighboring node.

In some implementations, the first subroutine neural network 360 receives multiple input sequences each corresponding to a respective neighboring node of the anchor node 376. The input sequence corresponding to a particular neighboring node can includes two elements: the node cost of the neighboring node in the set of node costs 362 and the cost of the edge between the anchor node 376 and the neighboring node. The input mask of the first subroutine neural network 360 can be a mask of all zeros; that is, the input mask does not mask any element of the input sequences.

In some such implementations, the first subroutine neural network 360 can process each input sequence separately. In some other such implementations, the first subroutine neural network 360 can process each input sequence concurrently. As a particular example, the first subroutine neural network 360 can receive the multiple input sequences in a matrix, where each row corresponds to a respective different neighboring node. The first subroutine neural network 360 can provide this matrix as input to the encoder neural network of the first subroutine neural network 360.

In some such implementations, the subroutine network output for the first subroutine neural network 360 includes, for each neighboring node, an output pointer, e.g., the output pointer 148 depicted in FIG. 1, identifying the minimum element between the node cost of the neighboring node and the cost of the edge between the anchor node 376 and the neighboring node. For example, the output pointer can be a vector that includes an element corresponding to each neighboring node. In some such implementations, the first subroutine neural network 360 does not generate an output value.

In some implementations, the first subroutine neural network 360 does not include a masking neural network. That is, because the input mask of the second subroutine neural network does not mask any elements of the input sequences, the second subroutine neural network does not need to generate an output mask that will be used as the input mask at future time steps.

The first subroutine neural network 360 can provide the set of node costs 362 to the second subroutine neural network 370, which is configured to determine the minimum node cost in the set of node costs 362.

In particular, the set of node costs 362 can be the input sequence to the second subroutine neural network 370. The second subroutine neural network 370 can also have a predetermined initial input mask that does not mask any element except the anchor node.

The second subroutine neural network 370 can process the set of node costs 362 and the initial input mask to generate a pointer, e.g., the pointer 148 depicted in FIG. 1, to the minimum element in the set of node costs 362. That is, the second subroutine neural network 370 has been configured through training to generate a pointer to the minimum element in the set of node costs 362 as the output of the decoder neural network of the subroutine neural network 370, e.g., the decoder neural network 130 depicted in FIG. 1.

The masking neural network of the second subroutine neural network 370, e.g., the masking neural network 150 depicted in FIG. 1, can generate an output mask 372 that masks out the selected minimum element in the set of node costs 362. That is, the masking neural network can receive i) the initial input mask and ii) a pointer to the minimum element in the set of node costs 362 and generate an output mask 372 that is the same as the initial input mask except for the element of the output mask 372 corresponding to the minimum element in the set of node costs 362.

The second subroutine neural network 370 can determine the new anchor node for the next time step to be the node corresponding to the determined minimum element of the set of node costs 362.

The second subroutine neural network 370 can then provide the minimum node cost 374 of the determined new anchor node to an appending engine 380 that appends the minimum cost 374 to the minimum spanning tree 356. The second subroutine neural network 370 can provide data identifying the new anchor node 376 to the first subroutine neural network 360.

The second subroutine neural network 370 can also output the output mask 372 so that the second subroutine neural network 370 can use the generated output mask 372 as the input mask of the next time step. That is, in the next time step, the second subroutine neural network 370 uses the output mask 372 as the input mask, and uses the set of node costs 362 (which has been updated by the first subroutine neural network 360 in the next time step) as the input sequence, to generate a pointer to the next minimum element in the set of node costs 362.

After the final time step, the appending engine 380 has appended each subsequent node cost 374 of the anchor nodes corresponding to each time step to the minimum spanning tree 356. The minimum spanning tree system 350 can then output the minimum spanning tree 356.

Figure 4:
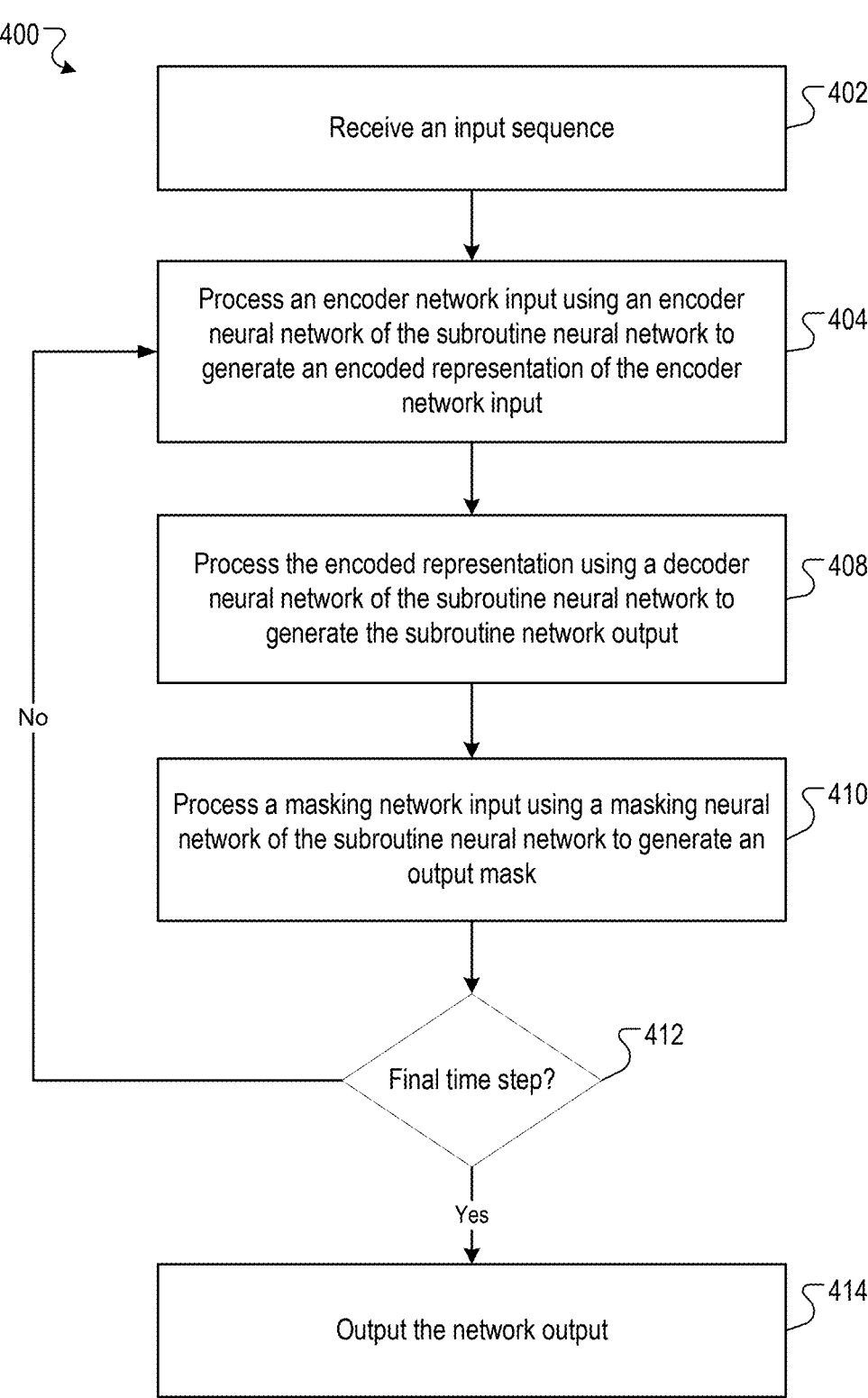
FIG. 4 is a flow diagram of an example process for generating a network output from an input sequence.

FIG. 4 is a flow diagram of an example process 400 for generating a network output from an input sequence. For convenience, the process 400 will be described as being performed by a system of one or more computers located in one or more locations. For example, a neural network system that includes a subroutine neural network, e.g., the subroutine neural network 100 depicted of FIG. 1, appropriately programmed in accordance with this specification, can perform the process 400.

The system can perform the process 400 for each of multiple time steps in the execution of a subroutine neural network.

The system receives an input sequence (step 402).

The system processes an encoder network input using an encoder neural network of the subroutine neural network to generate an encoded representation of the encoder network input (step 404). The encoder network input can include i) the input sequence of the subroutine neural network and ii) an input mask corresponding to the input sequence.

The system processes the encoded representation using a decoder neural network of the subroutine neural network to generate the subroutine network output (step 408). The subroutine network output can include an output value, an output pointer, or both.

The system processes a masking network input using a masking neural network of the subroutine neural network to generate an output mask (step 410). The masking network input can include the input mask and the output pointer generated by the decoder neural network. The output mask can be used as the input mask by the encoder neural network in a subsequent time step.

The system determines if the current time step is the final time step (step 412).

If the system determines that the current time step is not the final time step, the system returns to step 404 to execute another time step of the subroutine neural network.

If the system determines that the current time step is the final time step, the system outputs the network output (step 414). In some implementations, the network output is the subroutine network output generated in the final time step. In some other implementations, the network output is generated from the subroutine network outputs of the multiple time steps; for example, the network output can be a sequence that includes each subroutine network output.

The system can perform the process 400 on input sequences in a set of training data, i.e., a set of inputs for which the network output that should be generated by the system is known. The system can use the training data to train the encoder neural network, decoder neural network, and/or masking neural network to determine trained values for the parameters of the neural networks.

The process 400 can be performed repeatedly on inputs selected from a set of training data as part of a conventional machine learning training technique to train the initial neural network layers, e.g., a gradient descent with backpropagation training technique that uses a conventional optimizer, e.g., the Adam optimizer. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the subroutine neural network in parallel.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

In addition to the embodiments described above, the following embodiments are also innovative:

Embodiment 1 is a system comprising one or more computers and one or more storage devices storing instructions that when executed by the one or more computers cause the one or more computers to implement a sequence transduction neural network for transducing an input sequence comprising a respective input element at each of a plurality of input positions into an output sequence comprising a respective output element at each of a plurality of output positions, the sequence transduction neural network comprising:

one or more subroutine neural networks that are each configured to, at each of a plurality of time steps, receive a subroutine network input and to generate a subroutine network output, wherein the subroutine network input comprises a subroutine input sequence comprising a respective subroutine input element at each of a plurality of subroutine input positions, wherein each subroutine neural network comprises:

an encoder neural network configured, at each of the plurality of time steps, to receive an encoder network input comprising i) the subroutine input sequence of the subroutine neural network and ii) an input mask that masks one or more subroutine input elements of the subroutine input sequence and to generate an encoded representation of the encoder network input;

a decoder neural network configured, at each of the plurality of time steps, to receive the encoded representation and to generate the subroutine network output; and a masking neural network configured, at each of the plurality of time steps, to receive a masking network input comprising i) the input mask of the encoder neural network and ii) an intermediate output of the decoder neural network and to generate a masking network output comprising an output mask for use as the input mask of the encoder neural network at a subsequent time step of the plurality of time steps.

Embodiment 2 is the system of embodiment 1, wherein:

the encoder neural network comprises a sequence of one or more encoder subnetworks, each encoder subnetwork configured, at each of the plurality of time steps, to receive a respective encoder subnetwork input element for each of the plurality of input positions and to generate a respective encoder subnetwork output element for each of the plurality of input positions; and each encoder subnetwork comprises a masked self-attention neural network layer that is configured to receive the encoder subnetwork input element for each of the plurality of input positions and, for each particular input position, apply a self-attention mechanism over the encoder subnetwork input elements at the plurality of input positions to generate a respective attention output for the particular input position according to the input mask.

Embodiment 3 is the system of embodiment 2, wherein the encoder neural network comprises an embedding layer configured to:

for each subroutine input element in the subroutine input sequence, map the subroutine input element to an embedded representation of the subroutine input element; and provide the embedded representations of the subroutine input elements as the encoder subnetwork input elements for a first encoder subnetwork in the sequence of encoder subnetworks.

Embodiment 4 is the system of embodiment 3, wherein the embedded representation for each subroutine input element is a bitwise embedding.

Embodiment 5 is the system of any one of embodiments 1-4, wherein:

the decoder neural network comprises a sequence of one or more decoder subnetworks, each decoder subnetwork configured, at each of the plurality of time steps, to receive a respective decoder subnetwork input element for each of the plurality of input positions and to generate a respective decoder subnetwork output element for each of the plurality of input positions; and each decoder subnetwork comprises an encoder-decoder attention neural network layer that is configured to receive an input for each input position and, for each particular input position, apply a self-attention mechanism over the encoded representation at the input positions using one or more queries derived from the input for the particular input position to generate an updated representation for the particular input position.

Embodiment 6 is the system of embodiment 5, wherein the decoder neural network further comprises a stack of one or more output neural network layers that each comprises a learned linear transformation and an activation function, where the stack of output neural network layers is configured to receive the decoder subnetwork output elements of a final decoder subnetwork of the sequence of decoder subnetworks and to generate a value of the subroutine network output.

Embodiment 7 is the system of embodiment 6, wherein the subroutine network output comprises a value, a pointer, or both.

Embodiment 8 is the system of embodiment 7, wherein the pointer is generated according to the updated representations of the encoder-decoder attention neural network layer of a final decoder subnetwork of the sequence of decoder subnetworks.

Embodiment 9 is the system of any one of embodiments 5-8, wherein the masking network input further comprises the updated representations of the encoder-decoder attention neural network layer of a final decoder subnetwork of the sequence of decoder subnetworks.

Embodiment 10 is the system of embodiment 9, wherein the input mask and the updated representations of the encoder-decoder attention neural network layer of the final decoder subnetwork are concatenated.

Embodiment 11 is the system of any one of embodiments 5-10, wherein the decoder subnetwork input elements for a first decoder subnetwork of the sequence of decoder subnetworks is a zero-vector.

Embodiment 12 is the system of any one of embodiments 1-11, wherein the masking neural network comprises one or more of:

one or more one-dimensional convolutional neural network layers, one or more feed-forward neural network layers, or an activation function that is configured to generate the output mask.

Embodiment 13 is the system of any one of embodiments 1-12, wherein the output mask of a current time step is the input mask of a subsequent time step in the plurality of time steps.

Embodiment 14 is the system of any one of embodiments 1-13, wherein the output mask of a first subroutine neural network of the one or more subroutine neural networks in a current time step is the input mask of a second subroutine neural network of the one or more subroutine neural networks at a subsequent time step in the plurality of time steps.

Embodiment 15 is the system of any one of embodiments 1-14, wherein the one or more subroutine neural networks comprise one or more of:

a comparison subroutine neural network, an arithmetic subroutine neural network, or a pointer manipulation subroutine neural network.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to implement a sequence transduction neural network for transducing an input sequence comprising a respective input element at each of a plurality of input positions into an output sequence comprising a respective output element at each of a plurality of output positions, the sequence transduction neural network comprising;

one or more subroutine neural networks that are each configured to, at each of a plurality of time steps, receive a subroutine network input and to generate a subroutine network output, wherein the subroutine network input comprises a subroutine input sequence comprising a respective subroutine input element at each of a plurality of subroutine input positions,
wherein each subroutine neural network comprises:

an encoder neural network comprising a masked self-attention layer, wherein the encoder neural network is configured to, at each of the plurality of time steps, receive an encoder network input comprising i) the subroutine input sequence of the subroutine neural network and ii) an input mask that masks one or more subroutine input elements of the subroutine input sequence and to process the subroutine input sequence of the subroutine neural network while masking out the one or more subroutine input elements of the subroutine input sequence to generate an encoded representation of the encoder network input;

a decoder neural network configured, at each of the plurality of time steps, to receive the encoded representation and to generate the subroutine network output; and a masking neural network configured to perform conditional masking, the masking neural network being configured to, at each of the plurality of time steps:

receive a masking network input comprising i) the input mask of the encoder neural network for the time step that masks the one or more subroutine input elements of the subroutine input sequence and ii) an output from a portion of the decoder neural network and to process the input mask of the encoder neural network for the time step and the output from the portion of the decoder neural network to generate a masking network output comprising an output mask that masks a different one or more subroutine input elements of the subroutine input sequence from the input mask; and provide the output mask for the time step as an input mask of the encoder neural network at a subsequent time step of the plurality of time steps.

2. The system of claim 1, wherein:
the encoder neural network comprises a sequence of one or more encoder subnetworks, each encoder subnetwork configured, at each of the plurality of time steps, to receive a respective encoder subnetwork input element for each of the plurality of input positions and to generate a respective encoder subnetwork output element for each of the plurality of input positions; and each encoder subnetwork comprises a masked self-attention neural network layer that is configured to receive the encoder subnetwork input element for each of the plurality of input positions and, for each particular input position, apply a self-attention mechanism over the encoder subnetwork input elements at the plurality of input positions to generate a respective attention output for the particular input position according to the input mask.

3. The system of claim 2, wherein the encoder neural network comprises an embedding layer configured to:
for each subroutine input element in the subroutine input sequence, map the subroutine input element to an embedded representation of the subroutine input element; and provide the embedded representations of the subroutine input elements as the encoder subnetwork input elements for a first encoder subnetwork in the sequence of encoder subnetworks.

4. The system of claim 3, wherein the embedded representation for each subroutine input element is a bitwise embedding.

5. The system of claim 1, wherein:
the decoder neural network comprises a sequence of one or more decoder subnetworks, each decoder subnetwork configured, at each of the plurality of time steps, to receive a respective decoder subnetwork input element for each of the plurality of input positions and to generate a respective decoder subnetwork output element for each of the plurality of input positions; and each decoder subnetwork comprises an encoder-decoder attention neural network layer that is configured to receive an input for each input position and, for each particular input position, apply a self-attention mechanism over the encoded representation at the input positions using one or more queries derived from the input for the particular input position to generate an updated representation for the particular input position.

6. The system of claim 5, wherein the decoder neural network further comprises a stack of one or more output neural network layers that each comprises a learned linear transformation and an activation function, where the stack of output neural network layers is configured to receive the decoder subnetwork output elements of a final decoder subnetwork of the sequence of decoder subnetworks and to generate a value of the subroutine network output.

7. The system of claim 6, wherein the subroutine network output comprises a value, a pointer, or both.

8. The system of claim 7, wherein the pointer is generated according to the updated representations of the encoder-decoder attention neural network layer of a final decoder subnetwork of the sequence of decoder subnetworks.

9. The system of claim 5, wherein the masking network input further comprises the updated representations of the encoder-decoder attention neural network layer of a final decoder subnetwork of the sequence of decoder subnetworks.

10. The system of claim 9, wherein the input mask and the updated representations of the encoder-decoder attention neural network layer of the final decoder subnetwork are concatenated.

11. The system of claim 5, wherein the decoder subnetwork input elements for a first decoder subnetwork of the sequence of decoder subnetworks is a zero-vector.

12. The system of claim 1, wherein the masking neural network comprises one or more of:

one or more one-dimensional convolutional neural network layers, one or more feed-forward neural network layers, or an activation function that is configured to generate the output mask.

13. The system of claim 1, wherein the output mask of a first subroutine neural network of the one or more subroutine neural networks in a current time step is the input mask of a second subroutine neural network of the one or more subroutine neural networks at a subsequent time step in the plurality of time steps.

14. The system of claim 1, wherein the one or more subroutine neural networks comprise one or more of:

a comparison subroutine neural network, an arithmetic subroutine neural network, or a pointer manipulation subroutine neural network.

15. A method comprising:

receiving an input sequence comprising a respective input element at each of a plurality of input positions; and processing the input sequence using sequence transduction neural network to generate an output sequence comprising a respective output element at each of a plurality of output positions, the sequence transduction neural network comprising:

one or more subroutine neural networks that are each configured to, at each of a plurality of time steps, receive a subroutine network input and to generate a subroutine network output, wherein the subroutine network input comprises a subroutine input sequence comprising a respective subroutine input element at each of a plurality of subroutine input positions, wherein each subroutine neural network comprises:

an encoder neural network comprising a masked self-attention layer, wherein the encoder neural network is configured to, at each of the plurality of time steps, receive an encoder network input comprising i) the subroutine input sequence of the subroutine neural network and ii) an input mask that masks one or more subroutine input elements of the subroutine input sequence and to process the subroutine input sequence of the subroutine neural network while masking out the one or more subroutine input elements of the subroutine input sequence to generate an encoded representation of the encoder network input;

a decoder neural network configured, at each of the plurality of time steps, to receive the encoded representation and to generate the subroutine network output; and a masking neural network configured to perform conditional masking, the masking neural network being configured to, at each of the plurality of time steps:

receive a masking network input comprising i) the input mask of the encoder neural network for the time step that masks the one or more subroutine input elements of the subroutine input sequence and ii) an output from the portion of the decoder neural network and to process the input mask of the encoder neural network for the time step and the output from the portion of the decoder neural network to generate a masking network output comprising an output mask that masks a different one or more subroutine input elements of the subroutine input sequence from the input mask; and provide the output mask for the time step as an input mask of the encoder neural network at a subsequent time step of the plurality of time steps.

16. The method of claim 15, wherein:

the encoder neural network comprises a sequence of one or more encoder subnetworks, each encoder subnetwork configured, at each of the plurality of time steps, to receive a respective encoder subnetwork input element for each of the plurality of input positions and to generate a respective encoder subnetwork output element for each of the plurality of input positions; and each encoder subnetwork comprises a masked self-attention neural network layer that is configured to receive the encoder subnetwork input element for each of the plurality of input positions and, for each particular input position, apply a self-attention mechanism over the encoder subnetwork input elements at the plurality of input positions to generate a respective attention output for the particular input position according to the input mask.

17. The method of claim 15, wherein:

the decoder neural network comprises a sequence of one or more decoder subnetworks, each decoder subnetwork configured, at each of the plurality of time steps, to receive a respective decoder subnetwork input element for each of the plurality of input positions and to generate a respective decoder subnetwork output element for each of the plurality of input positions; and each decoder subnetwork comprises an encoder-decoder attention neural network layer that is configured to receive an input for each input position and, for each particular input position, apply a self-attention mechanism over the encoded representation at the input positions using one or more queries derived from the input for the particular input position to generate an updated representation for the particular input position.

18. One or more non-transitory computer readable media storing instructions that when executed by one or more computers cause the one or more computers to implement a sequence transduction neural network for transducing an input sequence comprising a respective input element at each of a plurality of input positions into an output sequence comprising a respective output element at each of a plurality of output positions, the sequence transduction neural network comprising:

one or more subroutine neural networks that are each configured to, at each of a plurality of time steps, receive a subroutine network input and to generate a subroutine network output, wherein the subroutine network input comprises a subroutine input sequence comprising a respective subroutine input element at each of a plurality of subroutine input positions, wherein each subroutine neural network comprises:

an encoder neural network comprising a masked self-attention layer, wherein the encoder neural network is configured to, at each of the plurality of time steps, receive an encoder network input comprising i) the subroutine input sequence of the subroutine neural network and ii) an input mask that masks one or more subroutine input elements of the subroutine input sequence and to process the subroutine input sequence of the subroutine neural network while masking out the one or more subroutine input elements of the subroutine input sequence to generate an encoded representation of the encoder network input;

a decoder neural network configured, at each of the plurality of time steps, to receive the encoded representation and to generate the subroutine network output; and a masking neural network configured to perform conditional masking, the masking neural network being configured to, at each of the plurality of time steps:

receive a masking network input comprising i) the input mask of the encoder neural network for the time step that masks the one or more subroutine input elements of the subroutine input sequence and ii) an output from a portion of the decoder neural network and to process the input mask of the encoder neural network for the time step and the output from the portion of the decoder neural network to generate a masking network output comprising an output mask that masks a different one or more subroutine input elements of the subroutine input sequence from the input mask; and provide the output mask for the time step as an input mask of the encoder neural network at a subsequent time step of the plurality of time steps.

19. The system of claim 1, wherein the output from the portion of the decoder neural network comprises an output generated by an attention layer of the decoder neural network.

20. The system of claim 1, wherein the masking neural network is configured to generate the output mask provided as an input mask to the encoder neural network based on a result generated based on an attention layer of the decoder neural network.

* * * * *